(12) United States Patent
Bockholt et al.

(10) Patent No.: US 8,513,450 B2
(45) Date of Patent: Aug. 20, 2013

(54) PROCESS FOR PREPARING POLYSILANES

(75) Inventors: Andreas Bockholt, Munich (DE); Andreas Feigl, Munich (DE); Bernhard Rieger, Elchingen (DE)

(73) Assignee: Wacker Chemie AG, Munich (DE)

( * ) Notice: Subject to any disclaimer, the term of this patent is extended or adjusted under 35 U.S.C. 154(b) by 128 days.

(21) Appl. No.: 13/379,429

(22) PCT Filed: Jun. 10, 2010

(86) PCT No.: PCT/EP2010/058148
§ 371 (c)(1),
(2), (4) Date: Dec. 20, 2011

(87) PCT Pub. No.: WO2010/149499
PCT Pub. Date: Dec. 29, 2010

(65) Prior Publication Data
US 2012/0101291 A1    Apr. 26, 2012

(30) Foreign Application Priority Data
Jun. 24, 2009 (DE) .......................... 10 2009 027 169

(51) Int. Cl.
*C07F 7/12* (2006.01)
(52) U.S. Cl.
USPC ......................................... 556/481; 556/466
(58) Field of Classification Search
USPC ....................................................... 556/481
See application file for complete search history.

(56) References Cited

U.S. PATENT DOCUMENTS

2009/0169457 A1    7/2009 Auner et al.

FOREIGN PATENT DOCUMENTS

| DE | 4100917 | * 10/1992 |
| DE | 4110917 A1 | 10/1992 |
| DE | 102006034061 A1 | 1/2008 |

OTHER PUBLICATIONS

Aitken et al., "Polymerization of Primary Silanes to Linear Polysilanes Catalyzed by Titanocene Derivatives", Journal of Organometallic Chemistry, vol. 279, pp. C11-C13 (1985).
Cypryk et al., "Anionic Ring-Opening Polymerization of 1,2,3,4-Tetramethyl-1,2,3,4-tetraphenylcyclotetrasilane", J. Am. Chem. Soc., vol. 113, pp. 1046-1047 (1991).
Ishifune et al., "Electroreductive synthesis of oligosilanes and polysilanes with ordered sequences", Journal of Organometallic Chemistry, vol. 611, pp. 26-31 (2000).
Kipping et al., "Organic Derivatives of Silicon. Part XXV. Saturated and Unsaturated Silicohydrocarbons, Si4Ph8", J. Chem. Soc., vol. 119, pp. 830-847 (1921).
Miller, "Polysilane High Polymers", Chem. Rev., vol. 89, pp. 1359-1410 (1989).
Sakamoto et al., "Novel Anionic Polymerization of Masked Disilenes to Polysilyene High Polymers and Block Copolymers", J. Am. Chem. Soc., vol. 111, pp. 7641-7643 (1989).
Wesson et al., "Organosilane Polymers. III. Block Copolymers", Journal of Polymer Science: Polymer Chemistry Edition, vol. 19, pp. 65-72 (1981).
International Search Report for PCT/EP2010/058148 dated Jul. 2, 2010.
Hengge et al., PatBase Abstract of DE 41 10 917 A1 (1992).

* cited by examiner

*Primary Examiner* — Kamal Saeed
*Assistant Examiner* — Janet L Coppins
(74) *Attorney, Agent, or Firm* — Caesar, Rivise, Bernstein, Cohen & Pokotilow, Ltd.

(57) ABSTRACT

The invention provides a process for preparing polysilanes of the general formula (1) $Si_nR_{2n+2}$ (1), in which silane of the general formula (2) $R^1{}_mSiH_{4-m}$ (1a) is converted in the presence of boron compounds of the general formula (3) $R^2{}_3B$ (3), where $R^1$ is a hydrocarbyl radical having 1 to 18 carbon atoms, R is hydrogen or an $R^1$ radical, $R^2$ is fluorine, chlorine, bromine or a hydrocarbyl radical which has 1 to 18 carbon atoms and may bear substituents selected from fluorine, chlorine, bromine, iodine and $NO_2$, n has integer values from 2 to 100,000, and m is 0, 1 or 2.

19 Claims, No Drawings

PROCESS FOR PREPARING POLYSILANES

BACKGROUND OF THE INVENTION

The invention relates to a process for preparing polysilanes from monosilanes in the presence of Lewis-acid boron compounds.

There are a number of synthetic methods for preparing polysilanes:

The most widely used is the Wurtz-type coupling of chlorosilanes with elemental alkali metals in high-boiling solvents. This was described for the first time in F. S. Kipping (1921) J Chem Soc 119:830. However, carrying out the reaction is extremely complicated because of the harsh reaction conditions and the high reactivity or sensitivity of the starting materials. Furthermore, the product distribution is not homogeneous and modification of the polysilane can only be effected by use of other monomers. However, only monomers in which the functional groups are retained under strongly reducing reaction conditions are suitable for this purpose, which greatly restricts the choice of suitable chlorosilanes.

Furthermore, hydrosilanes can be coupled in the presence of transition metal catalysts with elimination of hydrogen to form polysilanes. This polymerization method has been known only since the end of the 1990s from J. F. Harrod, C. Aitken, E. Samuel (1985) J Organomet Chem 279:C11. The air- and water-sensitivity of the transition metal catalysts and the fact that virtually only primary silanes are suitable for this type of polymerization significantly restricts the possibilities for this type of polysilane synthesis. In addition, the strong hydrogen evolution in the polymerization in bulk and the resulting foaming of the polymer with a simultaneous decrease in viscosity can make carrying out the reaction difficult.

Furthermore, the catalyst residues cannot be completely separated off from the polysilane.

Polysilanes can also be prepared from masked disilenes by means of an extremely complicated monomer synthesis.

This type of polymerization was described for the first time in K. Sakamoto, K. Obata, H. Hirata, M. Nakajima, H. Sakurai (1989) J Am Chem Soc 111:7641. However, in this case the monomer synthesis limits the choice of substituents on the silicon to a similarly great degree as in the Wurtz-type coupling. Thus, neither an advantageous monomer synthesis nor a flexible silane polymerization is possible by means of this method.

DE 102006034061 A1 describes a technologically highly demanding plasma process for preparing polysilane from $SiCl_4$ and $H_2$. However, this process is costly and energy-intensive and requires both complex purification of the product and polymer-analogous reactions for converting the perchlorinated polysilane into the actual polysilane. Production of carbon-containing polysilanes is quite impossible.

A further possibility for the polysilane synthesis is the ring-opening polymerization of silacycles, but this method again has the disadvantage that the monomer synthesis is relatively complicated and a free choice of the substituents is once again not possible. This was firstly described in M. Cypryrk, Y. Gupta, K. Matyjaszewski (1991) J Am Chem Soc 113:1046. In addition, there is the possibility of reacting dichlorosilanes either electrochemically as described by M. Ishifune, S. Kashimura, Y. Kogai, Y. Fukuhara, T. Kato, H. B. Bu, N. Yamashita, Y. Murai, H. Murase, R. Nishida (2000) J Organomet Chem 611:26, or stepwise with dilithiated silane species to form polysilane as described by J. P. Wesson, T. C. Williams (1981) J Polym Sci, Part A: Polym Chem 19:65. The electrochemical procedure is energy-intensive, while the stepwise formation of the polysilane is very complicated and suitable virtually only for the laboratory scale. Both methods require, like the plasma synthesis, a polymer-analogous reaction of the perhalogenated polysilane.

Problems common to these known synthetic methods are the purification of the polymer, low molar masses and an excessively heterogeneous product distribution. In particular, the purity of the polymer in respect of metal contamination caused by the catalyst makes them suitable to only a limited extent for efficient use in industrial/electronic components.

In addition, free variation of the substituents on the polymer backbone and thus controlled setting of the carbon content is possible to only a limited extent in the known synthetic roots. This is, according to D. R. Miller, J. Michl (1989) Chem Rev 89:1359, attributable firstly to the sometimes extremely harsh reaction conditions and secondly to the nature of the catalysts used.

DESCRIPTION OF THE INVENTION

The invention provides a process for preparing polysilanes of the general formula (1)

$$Si_n R_{2n+2} \qquad (1),$$

wherein silane of the general formula (2)

$$R^1_m SiH_{4-m} \qquad (1a),$$

is reacted in the presence of boron compounds of the general formula (3)

$$R^2_3 B \qquad (3),$$

where
$R^1$ is a hydrocarbon radical having from 1 to 18 carbon atoms
R is hydrogen or a radical $R^1$,
$R^2$ is fluorine, chlorine, bromine or a hydrocarbon radical which has from 1 to 18 carbon atoms and may bear substituents selected from among fluorine, chlorine, bromine, iodine and $NO_2$,
n is an integer from 2 to 100,000 and
m is 0, 1 or 2.

The polysilanes of the general formula (1) can be prepared in a simple way under mild reaction conditions by reaction of silanes of the general formula (2) with Lewis-acid boron compounds of the general formula (3). Metal catalysts can be dispensed with in this way. Furthermore, it is not necessary to modify the polysilanes of the general formula (1) obtained in a polymer-analogous manner, and in addition freeing the product of the catalyst is simple.

In particular, volatile starting materials and catalyst can usually be easily separated off by distillation, sublimation or chromatography.

The polysilane of the general formula (1) obtained can be influenced here mainly via the parameter reaction temperature catalyst concentration:
the average degree of polymerization increases with increasing reaction temperature and catalyst concentration.

In addition, the carbon content of the polysilane can be controlled via the catalyst concentration and the nature of the catalyst. The carbon content of the polymer obtained can be adjusted by varying the concentration of catalyst and its Lewis-acidity by means of liberation of $SiH_4$.

$R^1$ is preferably a hydrocarbon radical which is free of ethylenic or acetylenic unsaturated bonds and has from 1 to 18 carbon atoms.

Examples of hydrocarbon radicals $R^1$ are alkyl radicals such as the methyl, ethyl, n-propyl, isopropyl, n-butyl, isobutyl, tert-butyl, n-pentyl, isopentyl, neopentyl, tert-pentyl radical, hexyl radicals such as the n-hexyl radical, heptyl radicals such as the n-heptyl radical, octyl radicals such as the n-octyl radical and isooctyl radicals such as the 2,2,4-trimethylpentyl radical, nonyl radicals such as the n-nonyl radical, decyl radicals such as the n-decyl radical, dodecyl radicals such as the n-dodecyl radical, octadecyl radicals such as the n-octadecyl radical; cycloalkyl radicals such as cyclopentyl, cyclohexyl, cycloheptyl radicals and methylcyclohexyl radicals; aryl radicals such as the phenyl, naphthyl and anthryl and phenanthryl radical; alkaryl radicals such as o-, m-, p-tolyl radicals, xylyl radicals and ethylphenyl radicals; aralkyl radicals such as the benzyl radical, the alpha- and β-phenylethyl radical.

The radical $R^1$ is preferably a phenyl radical or linear alkyl radical, in particular having from 1 to 10, especially from 1 to 6, carbon atoms. Particularly preferred hydrocarbon radicals $R^1$ are phenyl, n-propyl, ethyl and methyl radicals.

Examples of $R^2$ and preferred radicals $R^2$ are the examples given for $R^1$ and preferred radicals which may additionally bear substituents selected from among fluorine, chlorine, bromine, iodine and $NO_2$. Preference is given to all three radicals $R^2$ being identical. Preferred examples of substituted radicals $R^2$ are halogenated hydrocarbon radicals such as the chloromethyl, 3-chloropropyl, 3-bromopropyl, trifluoromethyl, pentafluoroethyl, heptafluoropropyl, 3,3,3-trifluoropropyl, 5,5,5,4,4,3,3-heptafluoropentyl radical and also the pentafluorophenyl, penta-chlorophenyl and heptafluorotolyl radicals.

Preference is given to n being an integer of at least 3, particularly preferably at least 5, in particular at least 10 and not more than 50,000, particularly preferably not more than 10,000, in particular not more than 1000.

The polysilanes of the general formula (1) can be fully substituted by hydrocarbon radicals $R^1$, i.e. $R=R^1$, or contain both hydrocarbon radicals $R^1$ and hydrogen radicals. Preference is given to at least 10 mol %, particularly preferably at least 20 mol %, in particular at least 30 mol %, and not more than 90 mol %, particularly preferably not more than 80 mol %, in particular not more than 70 mol %, of the radicals R in the polysilanes of the general formula (1) being hydrocarbon radicals $R^1$.

The polysilanes of the general formula (1) can be linear, branched or crosslinked. Preference is given to at least 10 mol %, particularly preferably at least 20 mol %, in particular at least 30 mol %, and not more than 70 mol %, particularly preferably not more than 60 mol %, of the silicon atoms in the polysilanes of the general formula (1) having at least 3 Si—Si bonds.

It is possible to use pure silanes of the general formula (2) or mixtures. The radicals R can thus also be different hydrocarbon radicals $R^1$.

In a particular embodiment, a maximum of 10 mol %, preferably a maximum of 3 mol %, of silanes of the general formula (2) in which m is 3 can be added. However, this is not preferred.

The temperature in the reaction is preferably at least 20° C., particularly preferably at least 50° C., in particular at least 80° C., and not more than 200° C., particularly preferably not more than 160° C., in particular not more than 120° C.

The reaction can be carried out with or without solvent. If solvents are used, aprotic and nonpolar solvents or solvent mixtures, preferably those having a boiling point or boiling range up to 120° C. at 0.1 MPa, are preferred. preferred solvents are alkanes such as pentane, n-hexane, hexane isomer mixtures, heptane, octane, naphtha, petroleum ether and siloxanes, in particular linear dimethylpolysiloxanes having trimethylsilyl end groups and preferably from 0 to 6 dimethylsiloxane units, or cyclic dimethylpolysiloxanes having preferably from 4 to 7 dimethylsiloxane units, for example, hexamethyldisiloxane, octamethyl-trisiloxane, octamethyl-cyclotetrasiloxane and decamethylcyclopentasiloxane.

The reaction is preferably carried out without solvent.

Preference is given to using at least 0.1 part by weight, particularly preferably at least 0.2 part by weight, in particular at least 0.5 part by weight, and not more than 30 parts by weight, particularly preferably not more than 15 parts by weight, in particular not more than 5 parts by weight of boron compounds of the general formula (3) per 100 parts by weight of silanes of the general formula (2).

The reaction can be carried out in a continuous or batch process.

The reaction is preferably carried out under protective gas, in particular Ar or $N_2$.

The polysilanes of the general formula (1) obtained can, for example, be used in electronic components based on organic semiconductors, as light-emitting or hole-conducting layers.

In addition, they are particularly suitable, for example, as precursors for the deposition of silicon and silicon carbide layers in which a particular carbon content has to be set.

All the above symbols in the above formulae have their meanings independently of one another in each case. In all formulae, the silicon atom is tetravalent.

In the following examples, all amounts and percentages are, unless indicated otherwise, by weight, and all pressures are 0.10 MPa (abs.) and all temperatures are 20° C.

EXAMPLE 20 mg (0.04 mmol) of tris(pentafluorophenyl)borane are weighed under protective gas into a 25 ml Schlenk flask. 1 g (9.2 mmol) of phenylsilane is then added to the catalyst and degassed by means of 3 freeze-thaw cycles. The reaction solution is then heated to 100° C. and stirred for 2 days. Remaining monomer and by-products formed are removed under a high vacuum. The polysilane is obtained as a viscous yellowish liquid. The results are shown in the following table:

| Ratio of substrate to catalyst | Temperature/ ° C. | $M_n$/ g/mol | $M_w$/ g/mol | $SiH_4$ evolution |
|---|---|---|---|---|
| 230 | 100 | 800 | 900 | − |
| 230 | 120 | 1670 | 2710 | − |
| 16 | 60 | 1440 | 2000 | + |
| 16 | 100 | 1500 | 2170 | + |

The invention claimed is:

1. A process for preparing polysilanes of the general formula (1)

$$Si_nR_{2n+2} \quad (1),$$

wherein silane of the general formula (2)

$$R^1{}_mSiH_{4-m} \quad (1a),$$

is reacted in the presence of boron compounds of the general formula (3)

$$R^2{}_3B \quad (3),$$

where $R^1$ is a hydrocarbon radical having from 1 to 18 carbon atoms

R is hydrogen or a radical $R^1$, $R^2$ is fluorine, chlorine, bromine or a hydrocarbon radical which has from 1 to 18 carbon atoms and optionally bears substituents selected from the group consisting of fluorine, chlorine, bromine, iodine and $NO_2$, n is an integer from 2 to 100,000 and m is 0, 1 or 2.

2. The process as claimed in claim 1, wherein the hydrocarbon radical $R^1$ is a member selected from the group consisting of phenyl, n-propyl, ethyl and methyl radical.

3. The process as claimed in claim 1, wherein the radical $R^2$ is a halogenated hydrocarbon radical.

4. The process as claimed in claim 1, wherein a reaction temperature is from 20° C. to 200° C.

5. The process as claimed in claim 1, wherein the reaction is carried out without solvent.

6. The process as claimed in claim 1, wherein from 0.1 to 30 parts by weight of boron compounds of the general formula (3) are used per 100 parts by weight of silanes of the general formula (2).

7. The process as claimed in claim 2, wherein the radical $R^2$ is a halogenated hydrocarbon radical.

8. The process as claimed in claim 2, wherein a reaction temperature is from 20° C. to 200° C.

9. The process as claimed in claim 3, wherein a reaction temperature is from 20° C. to 200° C.

10. The process as claimed in claim 2, wherein the reaction is carried out without solvent.

11. The process as claimed in claim 3, wherein the reaction is carried out without solvent.

12. The process as claimed in claim 4, wherein the reaction is carried out without solvent.

13. The process as claimed in claim 2, wherein from 0.1 to 30 parts by weight of boron compounds of the general formula (3) are used per 100 parts by weight of silanes of the general formula (2).

14. The process as claimed in claim 3, wherein from 0.1 to 30 parts by weight of boron compounds of the general formula (3) are used per 100 parts by weight of silanes of the general formula (2).

15. The process as claimed in claim 4, wherein from 0.1 to 30 parts by weight of boron compounds of the general formula (3) are used per 100 parts by weight of silanes of the general formula (2).

16. The process as claimed in claim 5, wherein from 0.1 to 30 parts by weight of boron compounds of the general formula (3) are used per 100 parts by weight of silanes of the general formula (2).

17. The process as claimed in claim 7, wherein a reaction temperature is from 20° C. to 200° C.

18. The process as claimed in claim 17, wherein the reaction is carried out without solvent.

19. The process as claimed in claim 18, wherein from 0.1 to 30 parts by weight of boron compounds of the general formula (3) are used per 100 parts by weight of silanes of the general formula (2).

* * * * *